United States Patent
Amirsolaimani et al.

(10) Patent No.: US 12,468,148 B2
(45) Date of Patent: Nov. 11, 2025

(54) WAVEGUIDE WITH A BEAM SPLITTER UPSTREAM OF OUTPUT REGION

(71) Applicant: Meta Platforms Technologies, LLC, Menlo Park, CA (US)

(72) Inventors: Babak Amirsolaimani, Redmond, WA (US); Sihui He, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 873 days.

(21) Appl. No.: 17/519,391

(22) Filed: Nov. 4, 2021

(65) Prior Publication Data
US 2023/0133264 A1     May 4, 2023

(51) Int. Cl.
| G02B 27/00 | (2006.01) |
| F21V 8/00 | (2006.01) |
| G02B 27/01 | (2006.01) |

(52) U.S. Cl.
CPC ....... G02B 27/0093 (2013.01); G02B 6/0036 (2013.01); G02B 27/0172 (2013.01); G02B 2027/0178 (2013.01)

(58) Field of Classification Search
CPC .............. G02B 27/0093; G02B 6/0036; G02B 27/0172; G02B 2027/0178; G02B 2027/0123; G02B 27/0081
See application file for complete search history.

(56) References Cited

U.S. PATENT DOCUMENTS

| 2017/0285346 A1* | 10/2017 | Pan | ...................... G02B 27/145 |
| 2018/0348522 A1* | 12/2018 | Young | .................. G02B 6/0076 |
| 2020/0192087 A1* | 6/2020 | Brown | ............... G02B 27/0081 |

FOREIGN PATENT DOCUMENTS

| WO | 2019144596 A1 | 8/2019 | |
| WO | WO-2021001841 A1 * | 1/2021 | ......... G02B 27/0172 |

OTHER PUBLICATIONS

International Preliminary Report on Patentability for International Application No. PCT/US2022/048321, mailed May 16, 2024, 9 pages.
International Search Report and Written Opinion for International Application No. PCT/US2022/048321, mailed Feb. 24, 2023, 10 pages.

* cited by examiner

*Primary Examiner* — Bumsuk Won
*Assistant Examiner* — Ray Alexander Dean
(74) *Attorney, Agent, or Firm* — Greenberg Traurig, LLP (57) ABSTRACT

A waveguide, e.g. a pupil-replicating waveguide, is provided. The waveguide includes a substrate having two outer surfaces, for propagating a beam of light in the substrate by reflecting the beam from the outer surfaces. An output coupler, such as a diffraction grating in the substrate, is configured for diffracting the impinging beam out of the substrate. A beam splitter is disposed in the substrate between the outer surfaces upstream of the output coupler, so as to avoid substantially intersecting the output beam. The partial reflector is configured for splitting the impinging beam, increasing the number of beam portions in the waveguide, thereby improving output pupil density.

8 Claims, 8 Drawing Sheets

WAVEGUIDE WITH A BEAM SPLITTER UPSTREAM OF OUTPUT REGION

TECHNICAL FIELD

The present disclosure relates to optical components, and in particular to waveguides usable in wearable displays.

BACKGROUND

Head-mounted displays (HMDs), near-eye displays (NEDs), and other wearable display systems can be used to present virtual scenery to a user, or to augment real scenery with dynamic information, data, or virtual objects. The virtual or augmented scenery can be three-dimensional (3D) to enhance the experience and to match virtual objects to real objects observed by the user. Eye position and gaze direction, and/or orientation of the user may be tracked in real time, and the displayed scenery may be dynamically adjusted depending on the user's head orientation and gaze direction, to provide a better experience of immersion into a simulated or augmented environment.

Lightweight and compact near-eye displays reduce strain on the user's head and neck, and are generally more comfortable to wear. The optics block of such displays can be the heaviest part of the entire system. Compact planar optical components, such as waveguides, gratings, Fresnel lenses, etc., may be employed to reduce size and weight of an optics block. However, compact planar optics may have limitations related to image quality, output pupil size and uniformity, pupil swim, field of view of the generated imagery, visual artifacts, etc.

BRIEF DESCRIPTION OF THE DRAWINGS

Example embodiments will now be described in conjunction with the drawings, which are not to scale, in which like elements are indicated with like reference numerals, and in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Reference throughout this specification to "one embodiment" or "an embodiment" means that a particular feature, structures, or characteristics may be combined in any suitable manner in one or more embodiments.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A pupil expander functions to expand a beam of light across an output pupil of an optical system, such as but not exclusively a near-eye display (NED), having a relatively small input pupil. Herein the term "eyebox" means a geometrical area for the user's eye where a good-quality image may be observed by a user of the NED. In display systems where the pupil expander is coupled to an image projector at its input, the pupil expander may provide multiple offset copies of an angular fan of beams generated by the image projector, and spreads the multiple offset copies of the beam fan over the output pupil. The output pupil may be thereby expanded, e.g. over an entire eyebox of the NED, to enable users with different distances between eyes, termed interpupillary distances, and with different facial features, to wear the NED comfortably. In display systems where the pupil expander is coupled to a source of illumination light at its input and to a display panel at its output, the pupil expander may provide multiple offset copies of a beam of illumination light emitted by the light source, and spreads the multiple offset copies of the beam over a usable area of the image projector.

A pupil-replicating waveguide may be used as a pupil expander, e.g. to carry an image from a projector to an eye of a user, or to illuminate a panel display with an expanded beam of light. A high degree of flatness and parallelism of waveguide surfaces may be desired to maintain good quality of the observed image. Pupil-replicating waveguides based on relatively thick substrates may be preferable in some implementations; for example, it may be easier to polish a thicker optical component, such as a waveguide, to high flatness and parallelism. Furthermore, a thicker substrate may allow for a larger light-input area. The gaps may appear due to larger lateral offsets of the in-coupled beam upon reflection from outer surfaces of a thicker waveguide. In accordance with some embodiments of the present disclosure, the output pupil gaps may be reduced or even completely eliminated by providing a beam splitter that is positioned only, or predominately, upstream of an output region of the waveguide from which an expanded output beam exits the waveguide. The beam splitter may be configured to split the in-coupled beam into beam portions propagating toward different ones of the outer surfaces, thereby at least partially filling in the output pupil gaps of the beam-replicating waveguide. In at least some embodiments the beam splitter is configured to split the beam propagating in the waveguide in a vertical plane, i.e. the plane of beam propagation that is normal to the outer surfaces of the waveguide at the location of the splitting, and may be referred to as the vertical beam splitter. Positioning of the beam splitter optically upstream of an output coupler of the waveguide may reduce image artifacts related to the beam splitter.

In accordance with the present disclosure, there is provided an optical waveguide comprising a substrate of optically transparent material, the substrate comprising: an input region configured to couple a beam of light into the substrate; an output region at a distance from the input region, the output region comprising an output coupler configured to direct the beam out of the substrate to form an output beam; two opposing outer surfaces for guiding the beam in the substrate by reflections therefrom; and a beam splitter disposed in an optical path of the beam between the input and output regions without an overlap with the output coupler, or overlapping at most a fraction of the output coupler when viewed in a vertical direction normal to at least one of the outer surfaces. The beam splitter is configured to split the beam into beam portions propagating toward opposite ones of the two opposing outer surfaces.

An input coupler may be provided to couple the beam into the substrate at angles of total internal reflection (TIR) from the surfaces. In some implementations, the input coupler may comprise an input diffraction grating, which may be supported by the substrate.

In some implementations, the output coupler may comprise at least one output diffraction grating extending across the output region along the surfaces and configured to out-couple a fraction of the beam from the substrate at each of a sequence of laterally offset locations to expand the output beam.

In any of the above implementations, the beam splitter may be configured to split the beam at least once before the beam reaches the output region.

In any of the above implementations, the output diffraction grating may be configured to not overlap when viewed in the vertical direction, or the beam splitter may overlap at most 20% of a total area of the at least one output diffraction grating when viewed in the vertical direction.

In any of the above implementations, the beam splitter may be configured to split the beam incident thereon into beam portions of substantially equal optical power.

In any of the above implementations, the beam splitter may comprise a partially reflective layer extending parallel to, and between, the outer surfaces. In at least some of such implementations, the partially reflective layer may be disposed at least a quarter of a thickness of the substrate away from each of the outer surfaces.

In any of the above implementations, the substrate may comprise a folding reflector in an optical path between the input region and the output region. The folding reflector may be configured to perform pupil replication along a first direction, the output coupler may be configured to perform pupil replication along a second direction different from the first direction, and the beam splitter may be configured to at least double a pupil replication density along at least one of the first and second directions.

In any of the above implementations, the substrate may comprise a polarization retarder disposed in the output region or upstream of the output region adjacent thereto.

An aspect of the present disclosure relates to a display apparatus comprising: a light source for emitting a beam of light, and a pupil-replicating waveguide comprising a substrate. The substrate comprises: an input region configured to couple, into the substrate, the beam received in an input pupil; an output region at a distance from the input region comprising an output coupler configured to out-couple at least a portion of the beam out of the substrate as output light; two opposing outer surfaces for guiding the beam in the substrate by reflections therefrom; and a beam splitter disposed in an optical path of the beam between the input and output regions without an overlap with the output coupler when viewed in a vertical direction normal to at least one of the outer surfaces, or overlapping at most a fraction of the output coupler. The beam splitter is configured to split the light beam into beam portions propagating toward opposite ones of the two opposing outer surfaces.

In some implementations of the display apparatus, the output coupler comprises an output diffraction grating configured to diffract at least a portion of the light beam into an eyebox outside of the waveguide. The beam splitter may be disposed away from an optical path of the light diffracted by the output diffraction grating into the eyebox. In some implementations the beam splitter may be disposed so as not to intersect more than 10% of a beam cross-section of the light diffracted by the output diffraction grating into the eyebox.

In any of the above implementations, the display apparatus may further comprise a display panel disposed to receive at least a portion of the output light and to provide image light, wherein the beam splitter may be disposed away from an optical path of the output light in the substrate.

In some implementations comprising a display panel, the display apparatus may further include a projection lens disposed to receive the image light from the display panel. The waveguide may be disposed in part between the projection lens and the display panel, and the beam splitter may be disposed not to intersect the image light propagating from the display panel to the projection lens, or to intersect no more than 10% of beam cross-section of said image light.

In any of the above implementations of the display apparatus, the beam splitter may comprise a partially reflective layer extending parallel to, and between, the outer surfaces.

A further aspect of the present disclosure provides a method for increasing optical pupil replication density, the method comprising: using, in an optical pupil replicating waveguide, a beam splitter for splitting, upstream of an output coupler of the waveguide, a beam of light propagating in the waveguide into sub-beams propagating toward different ones of two opposing outer surfaces of the waveguide, and to re-direct the sub-beams out of the waveguide without engaging the beam splitter.

In some implementations, the method may comprise using a beam splitting layer or layers extending between and along the outer surfaces away from an optical path of the beams to at least one of: an eye box of a near-eye display, or a pixel array of a panel display. In some implementations, the method may comprise using a polarization beam splitter extending between and along the outer surfaces away from an optical path of the beams to at least one of: an eye box of a near-eye display, or a pixel array of a panel display.

In any of the above implementations, the method may comprise using a folding reflector for pupil replication along a first direction, using an output coupler for pupil replication along a second, different direction, and using the beam splitter to at least double a pupil replication density along at least one of the first and second directions.

Figure 1:
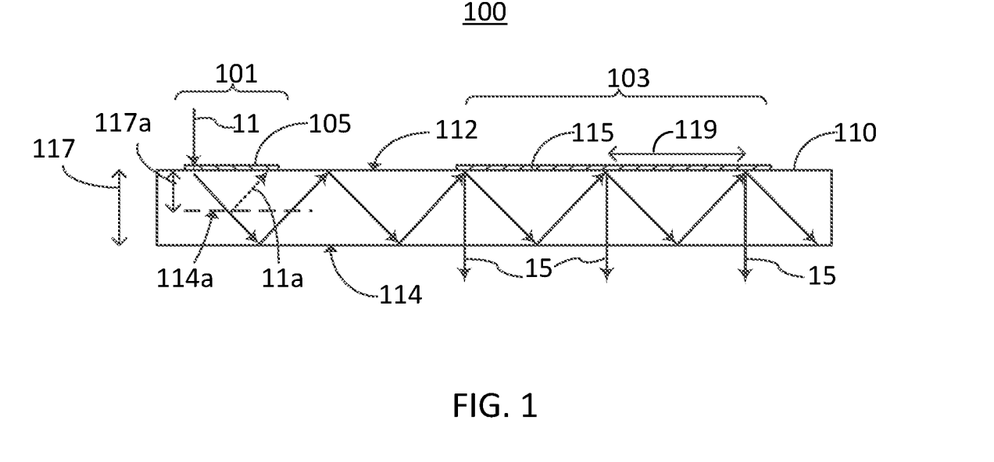
FIG. 1 is a schematic side view of a pupil replicating waveguide.
Figure 2:
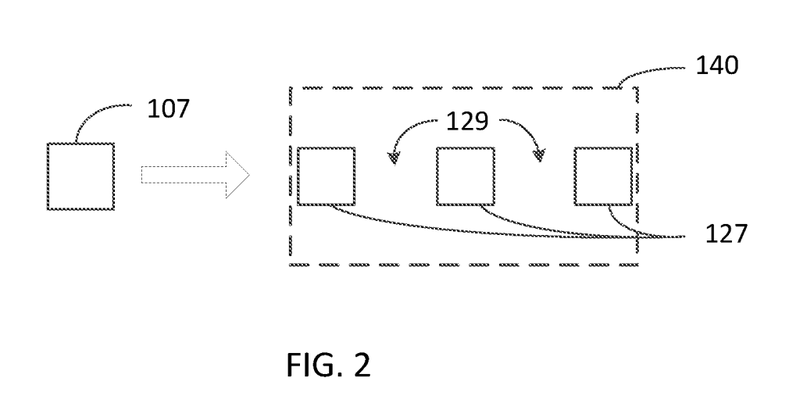
FIG. 2 is a schematic diagram illustrating pupil replication by the waveguide of FIG. 1.

Referring to FIG. 1, a pupil replicating waveguide 100 includes a substrate 110 having a light input region 101, a light output region 103, and two opposing outer surfaces 112, 114 configured for propagating a beam of light 11 in the substrate 110 by reflecting the beam 11 from the two surfaces 112, 114. The light input region 101 may have an area at least equal to an input pupil 107 of the waveguide, as illustrated in FIG. 2. Generally, the input pupil may be defined by an area of the input region 101 illuminated by the beam 11 impinging thereupon. The beam 11, schematically shown with solid arrows, is in-coupled into the substrate 110 by an input coupler 105 at an angle or angles exceeding a critical angle of total internal reflection (TIR) upon the surfaces 112 and 114, to cause the beam 11 propagate within the substrate 110 in a vertical zigzag pattern, bouncing off the surfaces 112 and 114 by TIR. Accordingly, the surfaces 114, 112 may also be referred to as the TIR surfaces of the substrate. In the context of this specification, "vertical" relates to a plane or direction normal to the opposing outer surfaces of TIR in a waveguide substrate. The input coupler 105 may be, for example, a diffraction grating or gratings extending across the input region 101 along one of the outer surfaces, e.g. 112, or a prism coupler. The output region 103 may include an output coupler 115 configured for directing offset beam portions 15 of the beam 11 out of the substrate 110 at consecutive incidences, thereby expanding the beam across an output pupil 140 that is larger than the input pupil 107, as schematically illustrated in FIG. 1B. The output coupler 115 may be embodied, for example, with one or more diffraction gratings extending across the output region 103 along the outer surfaces 112 and 114, and may be positioned at one or both of the outer surfaces 112 and 114, or between the outer surfaces 112 and 114.

The pupil replicating waveguide 100 provides multiple laterally offset parallel beam portions 15, which may be substantially lower-intensity copies or replicas of the light beam 11, illuminating a sequence of "pupil replicas" 127 spread across an output pupil 140 of the waveguide. The term "laterally offset", and derivatives thereof, is used herein to refer to a spatial offset between adjacent co-propagating beams in a plane normal to the direction of their propagation. The pupil replicas 127 may be separated by pupil holes 129 where the light intensity drops, which is generally undesirable. For a given angle of incidence of the input beam 11, the width (i.e. size in the direction of light propagation along the waveguide) of the pupil holes 129 depends on a distance 119 between consecutive out-coupling interactions of the light beam 11 with the output coupler 115, i.e. diffractions therefrom, and a corresponding width of the input pupil 107. The distance 119, which may be referred to as the replication step 119, depends on the angle of incidence upon the input coupler 105. In FIG. 1 the replication step 119 is illustrated for rays of the input light beam 11 of a particular wavelength that impinge upon the waveguide at normal incidence; the replication step 119 may be greater or smaller for rays of non-normal incidence. Therefore in embodiments where the input beam 11 is not collimated, the positions of pupil replicas 127, and the size of the pupil holes 129, may depend on a viewing angle.

Generally, for a fixed viewing angle or angle of incidence of the input beam 11, the replication step 119 may be decreased by decreasing the thickness 117 of the substrate 110, i.e. using a thinner waveguide, e.g. with a thickness 117a, which brings the opposing outer surfaces 112, 114 closer to each other, proportionally reducing the replication step 119 and increasing the number of pupil replicas 127 within the output pupil 140. In FIG. 1, the position of the lower opposing surface of the thinner waveguide is indicated at 114a by way of example. However, in this case a portion of the in-coupled beam 11 may impinge upon the input coupler 105 after reflecting of the opposing surface 114a of the thinner waveguide, which ads loss to the in-coupled light and reduces the waveguide efficiency. This can be avoided by reducing the size of the input region 101 proportionally to the waveguide thickness reduction, which however preserves the relative size of the pupil holes 129 relative to the size of the pupil replicas 127, i.e. preserving the pupil replication density. Here, the term "pupil replication density" refers to the cumulative size of all pupil replicas 127 relative to the size of the output pupil 140 in a pupil replication direction. The size of the output pupil 140 may be defined e.g. by a distance between opposing edges of the outer-most pupil replicas 127 across a range of angles of incidence of the input beam 11, as may be defined by a field of view (FOV) of the waveguide.

Figure 3:
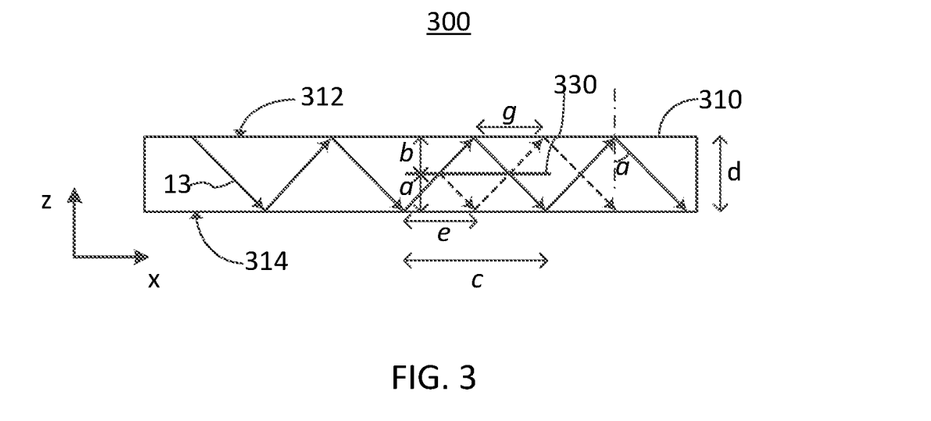
FIG. 3 is a schematic diagram of a portion of a pupil replicating waveguide with a partially reflecting beam splitter at equal distances from outer surfaces.

Referring now to FIG. 3, the pupil replication density by a pupil replicating waveguide may be increased by using a beam splitter extending between the TIR surfaces thereof. FIG. 3 schematically shows a vertical cross-section of a portion of a substrate 310 of waveguide 300 between input and output regions thereof (not shown), the substrate including a beam splitter 330 extending between and along TIR surfaces 312, 314 of the substrate and intersecting an optical path of an in-coupled beam 13. The beam splitter 330 may be ideally a 50/50 beam splitter configured to split the in-coupled beam impinging thereon into two beams of substantially equal optical power, i.e. within +\− 10% of each other, for at least some propagation angles of the in-coupled light. In some embodiments, and/or at some of the propagation angles of the in-coupled light, the power splitting coefficient of the beam splitter 330 may be, for example, in the range from 60/40 to 40/60, or in the range from 70/30 to 30/70.

The beam splitter 330 may be e.g. a partially reflecting surface or layer extending generally in parallel to the TIR surfaces 312, 314, having a reflectivity in a range from about 20% to about 80%. It may be formed, for example, by one or more layers of dielectric coating. The beam splitter 330 may also be a polarization beam splitter, for example it may be configured to reflect up to 100% of s-polarization and transmit up to 100% of p-polarization of light incident thereon in some range of angles of incidence of the in-coupled beam.

As the in-coupled beam 13 impinges upon the beam splitter 330, the in-coupled beam 13 splits into two beam portions, or beam replicas, which propagate toward different ones of the opposing TIR surfaces 312, and 314, thereby more uniformly spreading the light energy within the substrate 310 and at least partially filling in the pupil gaps 129. In embodiments where the beam splitter 330 is a partially reflecting surface (PRS) extending parallel to the TIR surfaces 312 and 314, each incidence of the beam upon the PRS splits the incident beam into a transmitted and reflected beam portions, or beam replicas, with the reflected portion also referred to herein as the split-off beam, split-off beam portion, or split-off beam replica.

FIG. 3 illustrates an embodiment where the beam splitter 330 is disposed at equal distances a and b from the TIR surfaces 314 and 312, respectively, so that a=b=d/2, where d is the thickness of the substrate. In this embodiment the beam replication step in the substrate, denoted as c, may be shortened by a factor of 2, thereby enabling a greater pupil replication density and enhanced illumination uniformity of the output pupil.

Figure 4:
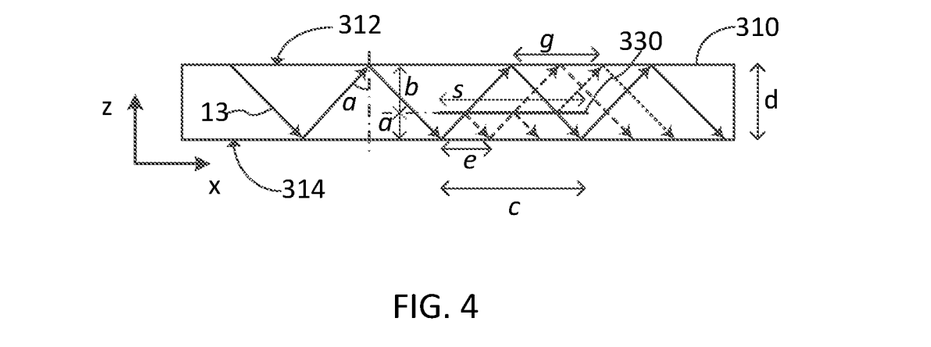
FIG. 4 is a schematic diagram of a portion of a pupil replication waveguide with a partially reflecting beam splitter at non-equal distances from outer surfaces.

FIG. 4 illustrates an embodiment where the beam splitter 330 is disposed closer to one of the TIR surfaces, e.g. 314, i.e. when a<b, a+b=d. A portion of the in-coupled beam 13 that is transmitted through the beam splitter 330 at each incidence thereon, as indicated by the solid arrows, propagates along a first zig-zag path between the TIR surfaces, reflecting from one of the surfaces, e.g. the first surface 312, at a first periodic sequence of locations $X_1=\{x_0, x_0+c, x_0+2c, \ldots\}$ spread by a distance c, where $x_0$ denotes a coordinate of a first incidence after transmitting through the beam splitter. A portion of the beam reflected from the beam splitter 330 once, i.e. a first split-off beam, propagates along a second zig-zag path that is shifted by a distance $e=c \cdot a/d$, reflecting from the first surface at a second periodic sequence of locations $X_2=\{x_0+e, x_0+c+e, x_0+2c+e, \ldots\}=(X_1+e)$. A second consecutive reflection off the beam splitter 330 produces a second split-off beam that propagates along a third zig-zag path that is shifted from the first zig-zag path by a distance $2e$, reflecting from the first surface at a periodic sequence of locations $X_3=(X_1+2e)$. A first reflection from the beam splitter 330 of the once-transmitted portion of the beam, on its way back to the first surface, produces a third split-off beam that propagates along a fourth zig-zag path that is shifted from the first zig-zag path by a distance $g=(c-e)$, reflecting from the first surface at a fourth sequence of locations $X_4=(X_1+c-e)$.

In some embodiments, the beam splitter 330 may be disposed at a distance from one of the outer surfaces 312, 314 equal to about one third of the substrate thickness d, i.e. b=2a, which results in c=3e. In such embodiments, the four location sets $X_i$, i=1, 2, 3, 4, sum up to an equidistant set of locations spread by a distance c/3 along the general direction of light propagation in the substrate. Thus, in this embodiment the beam replication step in the substrate may be shortened by a factor of 3, potentially enabling an even greater pupil replication density, and further enhancing illumination uniformity of the output pupil in some embodiments.

In some embodiments, the beam splitter 330 may be disposed at distances a and b from the outer surfaces 312 and 314, which ratio is not a rational number, for example that satisfy a "golden ratio" condition:

$$\frac{a}{b} = \frac{b}{a+b} = \frac{b}{d}$$

which corresponds to $a \cong 0.382 \cdot d$. In this case, the ratio of beam shifts e and c for the beam portions reflected from, and transmitted through, the beam splitter 330 is not a rational number either. Accordingly, these beam portions propagate along optical paths that have no shared segments, with their central rays impinging upon the outer surfaces 312 and 314 at different non-overlapping locations, which may facilitate better illumination uniformity of the output pupil. Other embodiments in which the ratio of distances a and b is an irrational number may also be contemplated.

Accordingly, the presence of the beam splitter 330 may increase output pupil density and enhance the illumination uniformity of the output pupil for a relatively thick substrate, without reducing the size of the input pupil. By way of example, embodiments described herein may use pupil replication waveguides with substrate thickness in the range from about 0.5 millimeter (mm) to about 1 mm, although substrates with thickness outside of this range are also within the scope of this disclosure. In some embodiments, the substrate thickness d may exceed about one half of a linear size of the input pupil in the plane of the substrate. Further by way of example, the beam splitter 330 may be disposed at a distance $a \geq d/4$ from each of the outer TIR surfaces of the substrate, although embodiments with the beam splitter 330 disposed closer to one of the TIR surfaces are also within the scope of the present disclosure.

Figure 5A:
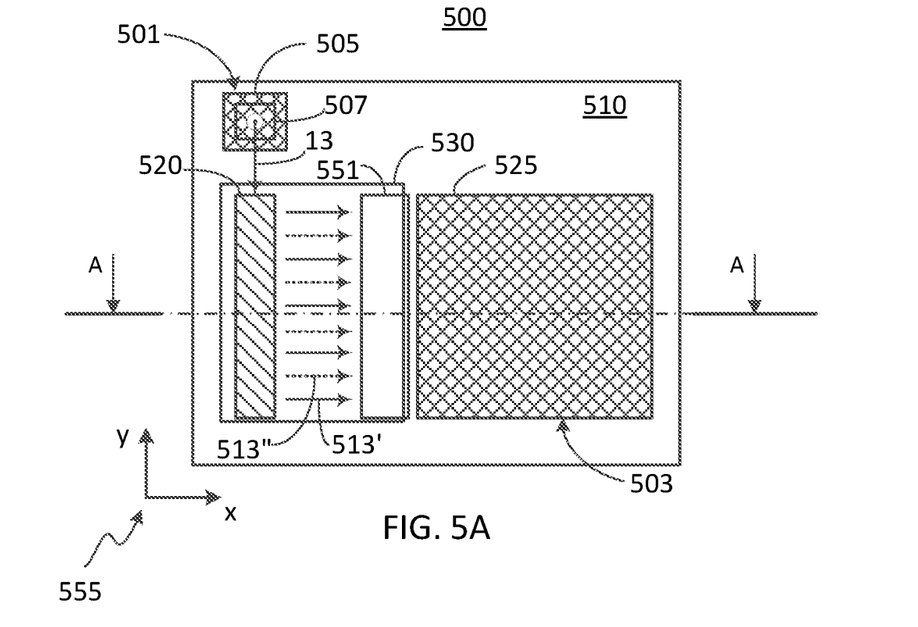
FIG. 5A is a schematic plan view of a pupil replicating waveguide with a folding reflector for pupil replication along two directions (2D) and a beam splitter upstream of an output coupler.
Figure 5B:
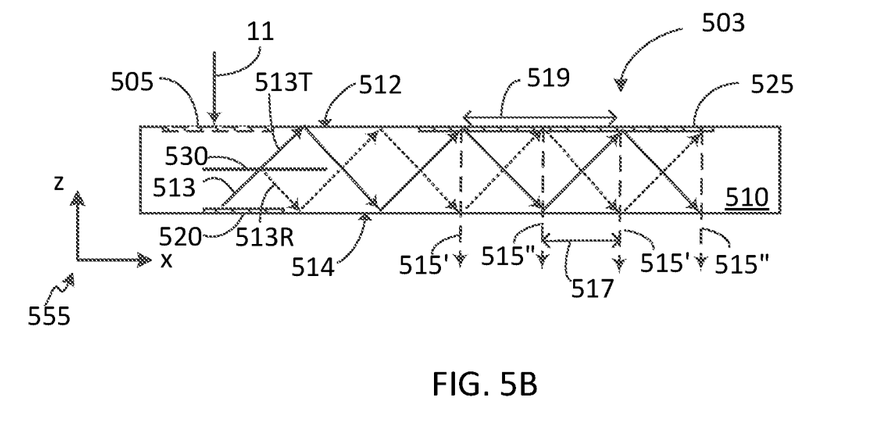
FIG. 5B is a schematic side view of the pupil replicating waveguide shown in FIG. 5A.

FIGS. 5A and 5B schematically illustrate, in plan and side views respectively, an example waveguide 500 configured for pupil replication along two different directions. In the examples described below these two directions are considered to be generally orthogonal, and thus may be described as aligned with the x- and y-axes of a Cartesian coordinate system (x,y,z) 555, although their orthogonality is not a requirement and embodiments may be envisioned with pupil replication along non-orthogonal directions.

Similarly to the waveguide 100, the waveguide 500 includes a substrate 510 having an input region 501, an output region 503 that is offset from the input region 501 in the plane of the substrate, and two opposing outer surfaces 512 and 514 for propagating a light beam 11 in the substrate 510 at least in part by reflections from the surfaces 514 and 512. In the description below the substrate 510 is considered to be planar, so that the propagation of light therein may be conveniently described relative to a same "global" coordinate system 555, which z-axis is perpendicular to the plane of the substrate. The substrate 510 may however have a curvature, for example to accommodate a human face, in which case the coordinate system 555 may be viewed as local to a region of the substrate being described, with its z-axis normal to the outer surfaces 512, 514 at the location being described. Thus, the term "plane of the substrate" may be understood as pertaining to a particular location or region of the substrate being described, and referring to a plane that can be viewed as locally parallel to the outer surfaces 512, 514 (the "(x,y) plane").

The input region 501 includes an input coupler 505, while the output region 503 includes an output coupler 525 extending thereacross. The input coupler 505 is configured to couple the input beam 11 of light into the substrate for propagation therein by reflection from the opposing outer surfaces 512 and 514, e.g. by TIR therefrom. Light of the input beam 11 coupled into the substrate 510 may be referred to as the in-coupled light (beam). The input coupler 505 may be, for example, a diffraction grating or gratings extending in the x-axis and y-axis directions across the input area 501 along one of the outer surfaces, e.g. surface 512 illuminated by the input light 11, or between the surfaces. Other embodiments of the input coupler 505 are also possible, for example using a prism. An input pupil 507 of the waveguide may be defined by an area of the input region 501 that is illuminated by the input beam 11.

Figure 6A:
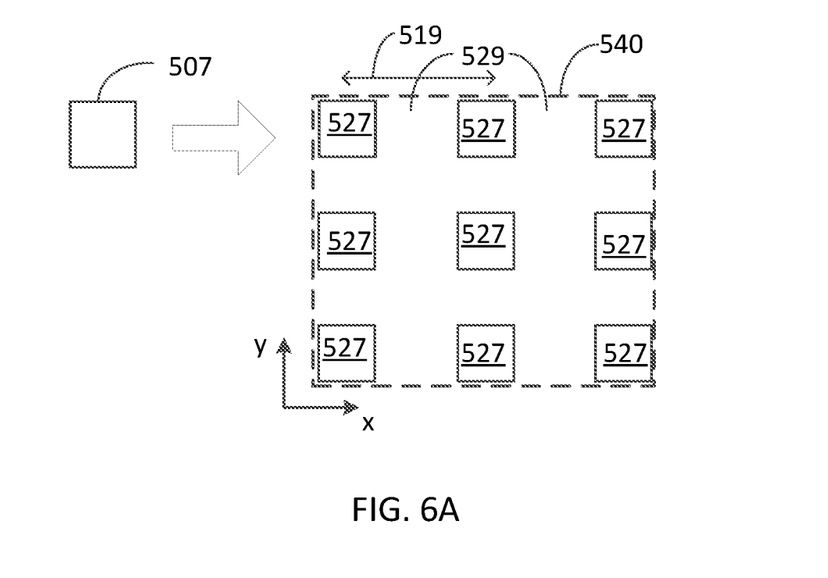
FIG. 6A is a schematic diagram illustrating pupil replication by the waveguide of FIG. 5A in the absence of the beam splitter.

As illustrated in FIG. 5A, the output region 503 may be offset from the input region 501 along each of the two directions, i.e. the x-axis and the y-axis. A folding reflector 520 is disposed to receive the in-coupled light 13 from the input coupler 505 and re-direct it toward the output coupler 525. The folding reflector 520 may be configured to cooperate with the output coupler 525 for pupil replication along the x- and y-axes directions, as schematically illustrated in FIGS. 6A and 6B.

Figure 6B:
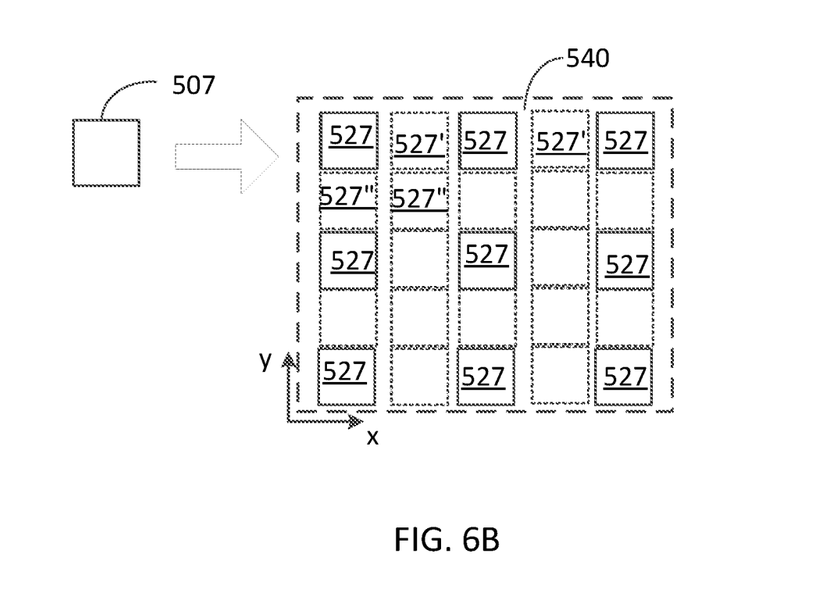
FIG. 6B is a schematic diagram illustrating pupil replication by the waveguide of FIG. 5A in the presence of the beam splitter.

The substrate 510 further includes a beam splitter 530 configured to increase the pupil replication density and to at least partially fill the pupil holes, as schematically illustrated in FIG. 6B. The beam splitter 530 may be an embodiment of the beam splitter 330 described above, and may be for example a partially reflecting surface or layer extending between the opposing outer surfaces 512 and 513, generally in parallel thereto, to split in-coupled light 13 in a vertical plane. The beam splitter 530 may be located in the path of the in-coupled light 13 upstream of the output region 503.

In some embodiments, the substrate 510 may further include a polarization converter 551, such as a retarder, upstream of the output coupler 525; this polarization converter 551 is schematically illustrated in FIG. 5A but is absent in FIG. 5B to avoid clutter. The polarization converter 551 may also be placed between the input coupler 505 and the folding reflector 520. The polarization converter 551 may be configured to adjust, e.g. rotate, the polarization of the in-coupled beam to improve uniformity of light coupled out of the substrate by the out-coupler 525, as described further below.

In the illustrated embodiment, the input coupler 505 is configured to direct the in-coupled light beam 13 to propagate along the first direction in the plane of the substrate, e.g. along the y-axis, toward the folding reflector 520. The folding reflector 520 may be aligned with the input coupler 505 in the first direction, and is configured to re-direct the in-coupled light beam 13 to propagate along the second direction (x-axis) toward the output region 503. The folding reflector 520 may be a suitably configured diffraction grating or gratings having a length in the first direction (y-axis) corresponding to a width of the output pupil (540, FIGS. 6A and 6B) in that direction, and sufficient to split the in-coupled light beam 13 into multiple laterally offset sub-beams 513' that are spread along the first direction (y-axis), as illustrated in FIG. 5A by a sequence of parallel solid arrows. In embodiments where the beam splitter 530 extends into a region of the substrate upstream of the folding reflector 520, and/or overlaps with the folding reflector 520, the beam splitter 530 may cooperate with the folding reflector 520 to form additional split-off folded sub-beams 513", which are illustrated in FIG. 5A with dotted arrows, thereby increasing the beam replication density along the first direction (y-axis). The laterally offset folded sub-beams 513' and 513" may be viewed as lower-power replicas of the in-coupled beam 13 or the input beam 11, and may be commonly referred to as (folded) sub-beams 513 or (folded) beam replicas 513.

FIG. 5B illustrates the propagation of a folded sub-beam 513, in the vertical plane (x,z), from the folding reflector 520 into the output region 503. The folded sub-beam 513 may represent one of folded sub-beams 513' or folded split-off sub-beams 513". The beam splitter 530 is disposed to intersect the sub-beam 513 at least once before reaching the output region 503, and is configured to split the sub-beam 513 into beam portions propagating toward different ones of the outer surfaces 512 and 514, as described above with reference to FIGS. 3 and 4. The beam splitter 530 may be e.g. a partially reflecting surface or layer extending generally in parallel with the outer surfaces 512 and 514 of the substrate, and may transmit a beam portion 513T of the sub-beam 513 incident thereon toward one of the outer surfaces, e.g. 512, and reflect a split-off beam portion 513R of the incident sub-beam 513 toward the other of the outer surfaces, e.g. 514. The beam portions 513T and 513R may be viewed as lower-intensity replicas of the input beam 11 coupled into the substrate. The optical paths of the transmitted and reflected beam portions 513T, 513R after the split are indicated in FIG. 5B by solid and dashed arrows, respectively. In some embodiments, the beam splitter may extend in the direction of the output region long enough to intersect the zig-zag optical paths of the transmitted and reflected beam portions 513R, 513T one or more times, resulting in further splitting into transmitted and reflected beam portions at each intersection, as described above with reference to FIGS. 3 and 4.

The output region 503 includes an output coupler 525 configured for coupling multiple offset portions of the in-coupled light incident thereon out of the substrate 510, thereby expanding the out-coupled beam in the second direction (x-axis) in the plane of the substrate. The output coupler 525 may include, for example, one or more diffraction gratings extending across the whole output region 503 along the outer surfaces 512 and 514, i.e. in the (x,y) plane. In FIG. 5A, the boundary of the output region 503 is shown by solid lines, and the one or more output gratings are indicated by crosshatching.

In the illustrated example, the output coupler 525 is embodied with a diffraction grating, e.g. a surface-relief grating, disposed at the outer surface 512 and configured to diffract a portion of the in-coupled light at each incidence thereon, to form a sequence of spatially offset out-coupled light beams that are spread into the second direction (x-axis). The output coupler 525 may also be embodied with a diffraction grating, e.g. a surface-relief grating, disposed at the other outer surface, i.e. 514, or between the surfaces. In other embodiments, the output coupler 525 may include two or more diffraction gratings, e.g. relief gratings, located at a same one, or at different ones of the outer surfaces 512 and 514, or between the surfaces. In some embodiments the output coupler 525 may include a volume Bragg grating (VBG) located between the outer surfaces 512 and 514. Furthermore, other type of diffraction gratings, e.g. hyperbolic metamaterial gratings, liquid crystal gratings, or so-called Pisa gratings comprising a plurality of slanted dielectric fringes, may be used. More broadly, any diffraction grating, or a plurality of diffraction gratings, supported by a substrate on the outside, inside, etc., and configured for diffracting an in-coupled light beam impinging thereon, may be used. In all these embodiments, at least one of such output gratings may be configured to diffract, e.g. in a first diffraction order, a portion of the in-coupled light beam incident thereon out of the substrate at each incidences thereon, to provide a sequence of spatially offset out-coupled beams.

Referring to FIG. 5B and FIG. 6A, in the absence of the beam splitter 530 the sub-beam 513 propagates as indicated by the solid arrows, bouncing between the outer surfaces 512 and 514 and being diffracted out of the substrate at each incidence upon the output coupler 525 from a same direction, to form a sequence of output sub-beams 515' with their central rays spaced by a distance 519 between consecutive diffractions. FIG. 6A schematically illustrates pupil replication by the waveguide 500 in the absence of the beam splitter 530. The folding reflector 520 and the output coupler 525 cooperate to replicate the input pupil 507 along the two orthogonal directions to form a 2D array of pupil replicas 527 spread across the output pupil 540. Rows of the array originate from respective folded sub-beams 513' provided by the folding reflector 520 (FIG. 5A), with different pupil replicas 527 in each row corresponding to different output sub-beams 515' produced by the output coupler 525 from one of the folded sub-beams 513'. The beam splitter 530 splits the sub-beam 513 into two sub-beams 513T and 513R, resulting into a second sequence of output sub-beams 515", which is interleaved with the first sequence of output sub-beams 515', thereby at least partially filling gaps that may be present between sub-beams 515'. Thus the presence of the beam splitter 530 increases the spatial density of beam-coupler interactions so that the total power of out-coupled light is spread over a greater number of out-coupled beam portions 515' and 515".

FIG. 6B schematically illustrates corresponding pupil replication in presence of the beam splitter 530, with the input pupil 507 now being replicated within the output pupil 540 of the waveguide 500 with a greater spatial density. The splitting of the sub-beams 513 into the transmitted and reflected beam portions 513T, 513R results in the appearance of additional pupil replicas 527' at least partially filling the gaps between the pupil replicas 527 in each row (x-axis). In embodiments where the beam splitter 530 extends to overlap with the folding reflector 520, and/or into the region upstream of the folding reflector 520, the vertical splitting of the in-coupled light 13 may produce the additional set of split-off folded sub-beams 513" as described above, which at least partially fill the gaps between the rows of pupil replicas 527' and increases the pupil replication density along the first direction (y-axis). The pupil replicas 527, 527', 527" shown in FIG. 6B may correspond to a specific angle of incidence of the input beam 11, for example to the normal incidence, and their position and spacing within the output pupil 540 may be different for rays of the input light beam that impinges upon the input coupler 505 at different angles of incidence.

In some embodiments, the diffraction efficiency of the output coupler 525 may be polarization-sensitive. For example, the diffraction efficiency may be greater for left circularly polarized light and lower for right secularly polarized light. Circularly polarized light typically changes its chirality after each TIR, which converts between left- and right-circular polarizations. When disposed upstream of the output coupler 525, the polarization converter 551 may be configured to convert sub-beams 513', 513" incident thereon to a mixed polarization state with approximately equal parts of left- and right-circular polarizations. In some embodiments, the polarization converter 551 may overlap with the output coupler 525 to convert between the left circular polarization and the right circular polarization after each TIR upon one of the outer surfaces 512, 514.

FIGS. 5A and 5B illustrate an embodiment where the beam splitter 530 is absent in the output region 503 and does not overlap with the output coupler 525. The term "overlap" and its derivatives, when used herein with reference to two or more elements of a waveguide, means an overlap between orthogonal projections of the elements onto one of the outer surface 512 or 514 of the substrate or, equivalently, an overlap between the elements as may be viewed in the vertical direction normal to the plane of the substrate. For example, the beam splitter 530 illustrated in FIGS. 5A and 5B overlaps the folding reflector 520 and does not overlap the output coupler 525 or any portion thereof. However, embodiments may be envisioned when a beam splitter, e.g. the beam splitter 530, extends into the output region 503 overlapping fully or partially the output coupler 525. Such embodiments may however have disadvantages when used in an image projection system, as described below, in particular when the beam splitter extends across most, or the whole, output region 503, fully overlapping the output coupler 525, or a functionally significant portion thereof.

Figure 7:
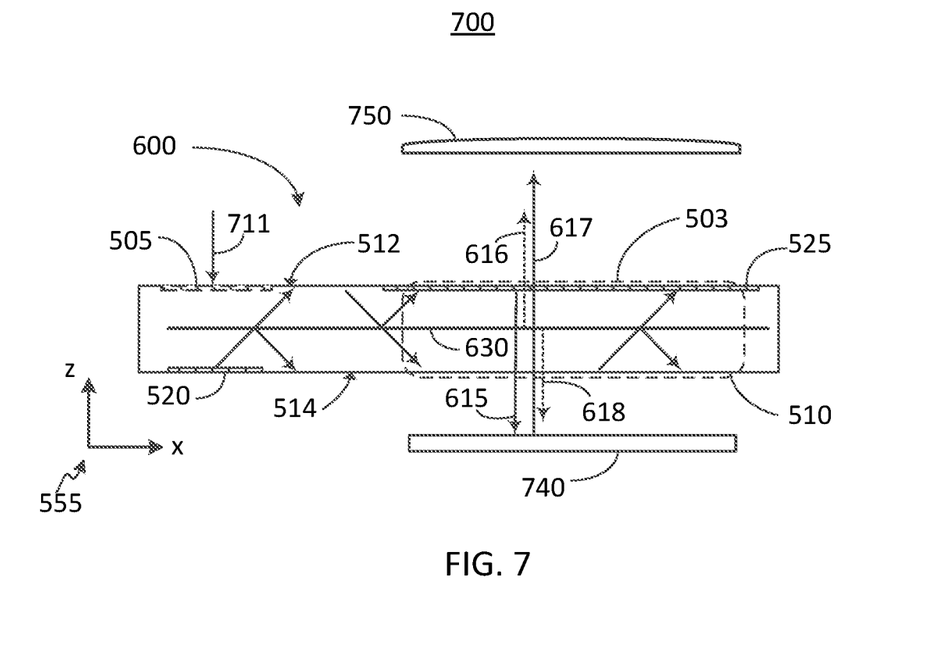
FIG. 7 is a schematic side view of a display apparatus using a pupil replicating waveguide with a beam splitter extending across the output region for expanding a beam of light illuminating a display panel.

FIG. 7 schematically illustrates, in a side cross-sectional view, a display apparatus 700, which utilizes a pupil replicating waveguide 600 to illuminate a display panel 740 with an expanded beam of illumination light. The pupil replicating waveguide 600 incorporates a beam splitter 630 that extends across an output region 503 thereof. The display apparatus 700 may be for example a near-eye display (NED). The pupil replication waveguide 600 may be a modification of the waveguide 500 described above with reference to FIGS. 5A and 5B; accordingly, elements of the waveguide 600 that are functionally same or similar to corresponding elements of waveguide 500 are labeled with the same reference numerals, and will not be described again. The beam splitter 630 differs from the beam splitter 530 in that the beam splitter 630 extends into the output region 503 of the substrate 510 to overlap with the output coupler 525, but may be an embodiment of the beam splitter 530 otherwise, and an embodiment of the beam splitter 330.

The display apparatus 700 includes a reflective display panel 740, and may further include a projection lens 750. In a NED implementation, the projection lens 750 may function as an ocular lens. In operation, an input beam 711 of illumination light is coupled into the waveguide 600 by an input coupler 505, and propagates toward the output coupler 525, generally as described above with reference to waveguide 500. The output coupler 525 re-directs the in-coupled beam impinging thereon toward the reflective display panel 740 as output light 615 comprising a plurality of offset beam replicas, e.g. such as beam replicas 515' and 515" described above. The display panel 740 incorporates a reflective pixel array facing the output region 503, the total area of the pixel array facing the output region defining a useful area of the display panel. The display panel 740 may be, for example, a reflective active-matrix LCOS (liquid crystal on silicon) display panel using a liquid-crystal (LC) layer on top of a silicon backplane, or a DLP (digital light processing) panel having a 2D array of tiltable micro-mirrors. The reflective display panel 740 reflects a spatially-modulated portion of the output light 615, i.e. image light 617, toward the projection lens 750 disposed opposite the display panel 740 at the other side of the waveguide. The projection lens 750 may be configured to project the image light 617 onto a screen or into an eye of a viewer (not shown). The projection lens 750 may function as an ocular lens in embodiments where the display apparatus 700 is a NED.

The presence of the beam splitter 630 across the output region 503 may however lead to spurious reflections therefrom of the output light 615 and the image light 617, illustrated by dashed arrows 616 and 618, respectively. These spurious reflections reduce efficiency of the display 700, and may further lead to undesirable artifacts in various applications, including a reduced image contrast, the appearance of an eye glow in AR applications, and the appearance of ghost images.

Figure 8:
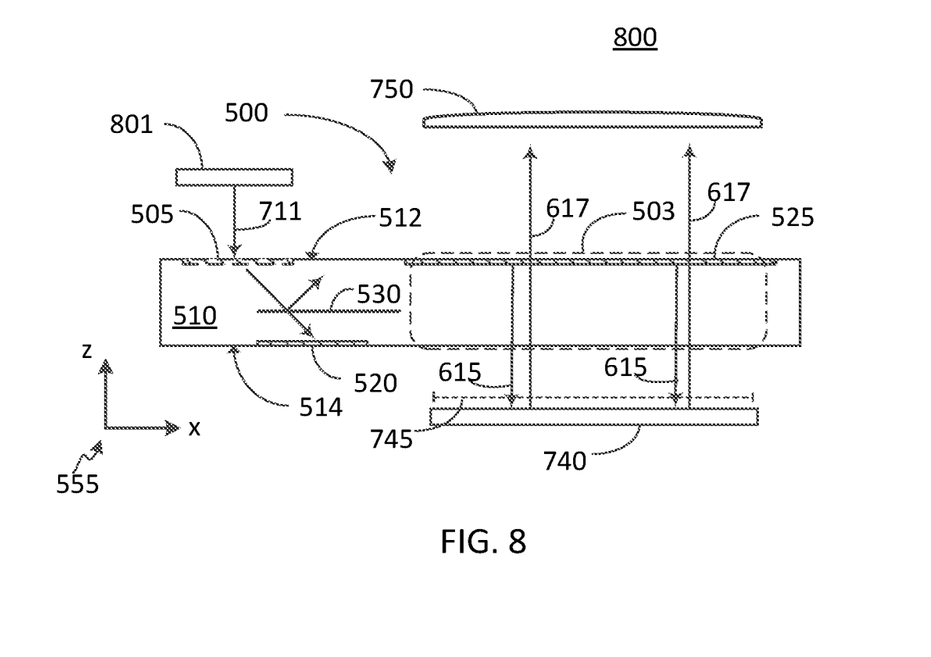
FIG. 8 is a schematic side view of a display apparatus using a pupil replicating waveguide with a beam splitter upstream of the output region for expanding a beam of light illuminating a display panel.

FIG. 8 illustrates a display apparatus 800 that illuminates the display panel 740 using the pupil replication waveguide 500 described above with reference to FIGS. 5A-6B, in which the beam splitter 530 is positioned substantially upstream of the output region 503 of the waveguide, and does not overlap, or has only a small overlap, with the output coupler 525 when viewed in the vertical direction (z-axis). The display apparatus 800 may be, for example a NED. The display apparatus 800 includes a light source 801, which is configured to illuminate the input coupler 505 of the waveguide 500 with an illumination light beam 711, for coupling into the substrate 510 as described above. In some embodiments the illumination light beam 711 may be collimated. In some embodiments the illumination light beam 711 may be non-collimated, e.g. divergent in an angular range comprising a field of view (FOV) of the apparatus. Similarly to the display apparatus 700, the display apparatus 800 further includes the reflective display panel 740 as described above, e.g. an LCOS or DLP display panel, which may be disposed facing the output region 503 of the waveguide to receive the output beam 615. The projection lens 750 may be provided to receive modulated image light 617 from the display panel 740, also as described above with reference to FIG. 7. In operation, the light beam 711 is coupled into the waveguide 500 by the input coupler 505, and propagates toward the folding reflector 520, which directs portions of the beam toward the output coupler 525. The beam splitter 530 splits the beam in a vertical plane, with split portions of the beam, or beam replicas, propagating toward the output coupler 525, as described above with reference to FIGS. 5A and 5B and split beam portions 513T and 513R. The output coupler 525 re-directs, e.g. diffracts, the split beam portions toward the reflective display panel 740 as the output light 615. The output light 615 thus comprises a plurality of spatially offset beam replicas, e.g. beam replicas 515' and 515", illuminating the usable area of the display panel 740 in accordance with corresponding pupil replicas, e.g. as schematically indicated at 527, 527', 527" in FIG. 6B. The display panel 740 reflects a spatially-modulated portion of the output light 615 toward the projection lens 750 as image light 617. The projection lens 750 may be configured to project the image light 617 onto a screen or into an eye of a viewer (not shown). The projection lens 750 may functions as an ocular lens in embodiments where the display apparatus 800 is a NED.

Since the beam splitter 530 is absent from the output region 503 and does not overlap, or has only a relatively small overlap, with the output coupler 525, the output and image beams 615, 617 are transmitted in the substrate without passing through the beam splitter 530, and therefore do not reflect therefrom. Accordingly, the beam splitter 530 increases the pupil replication density at the output pupil of the waveguide 500, thereby potentially enhancing the illumination uniformity of the display panel 640, without creating spurious reflections described above with reference to FIG. 7.

Figure 9:
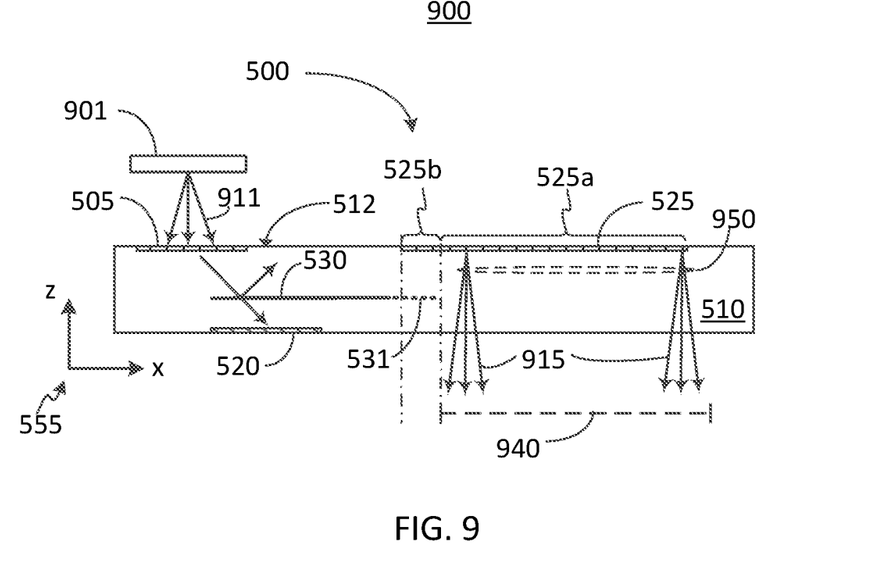
FIG. 9 is a schematic side view of a display apparatus using a pupil replicating waveguide with a beam splitter upstream of the output region to provide an expanded image beam to an eyebox.

FIG. 9 illustrates a display apparatus 900, such as a NED, that uses the pupil replicating waveguide 500, or a suitable embodiment thereof, to expand a beam 911 of image light from a light source 901 and to relay it to an eye box 940, i.e. a geometrical area for the user's eye where a good-quality image may be observed. The light source 901 is configured to operate as an image projector, and in operation provides the beam 911 of image light comprised of an angular fan of beams carrying an image in angular domain, and at angles of incidence upon the substrate 510 spanning a field of view (FOV) of the NED.

The image projector 901 may be embodied, for example, using a pixilated display panel, e.g. an LCD micro display, optionally having suitable optics at its output. It may also be embodied using a light source, such as e.g. one or more light-emitting diodes (LED), superluminescent light-emitting diodes (SLED), side-emitting laser diodes, vertical-cavity surface-emitting laser diodes (VCSEL), etc, followed by an image beam scanner.

The pupil replicating waveguide 500 provides an output beam 950 composed of multiple offset replicas 915 of the angular fan of beams 911 generated by the image projector 901, and spreads these beam replicas 915 over the eyebox 940, with the pupil holes at least partially filled by the split-off beam replicas produced by the beam splitter 530, as described above. Also as described above, the beam splitter 530 is disposed upstream of the output coupler 525, so as to avoid, or at least reduce, an overlap with the output coupler 525 when viewed in projection on the plane of the substrate 510, and to avoid or at least reduce spurious reflections of the output beam 950 off the beam splitter 530 as described above with reference to FIG. 7. In some embodiments, the beam splitter 530 may be disposed in the optical path of the beam 911 in the substrate 510 upstream off the output coupler 525, so as not to overlap with any portion thereof; in FIG. 9, an example position of the beam splitter 530 in such embodiments is illustrated by a solid line.

In some embodiments, an edge portion of the beam splitter 530 may overlap a relatively small portion 525b of the output coupler 525; by way of example, the overlapping edge portion 531 of the beam splitter 530 in one such embodiment is illustrated in FIG. 9 by a dashed line. In some embodiments the overlap between the beam splitter 530 and the output coupler may be at most 20%, or at most 10%, or at most 5%, of the total area of the output coupler 525 in the plan of the waveguide, i.e. as represented by the (x,y) plane of the Cartesian coordinate system 555 in FIGS. 10A and 10B. In some embodiments, at least 50% of a total area of the output coupler 525 centered in the middle of the output region 503 is being free of an overlap with the beam splitter 530.

Figure 10A:
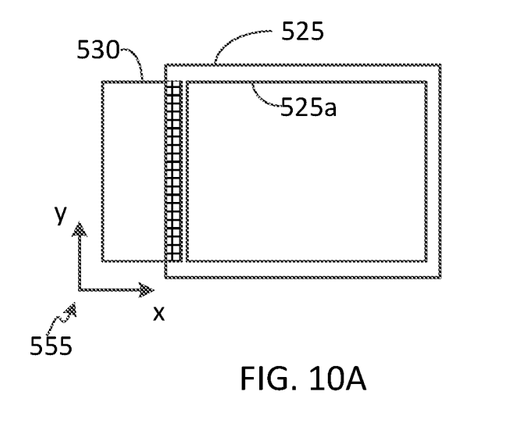
FIG. 10A is a schematic plan view of a beam splitter partly overlapping a non-useable area of an output coupler of a pupil replicating waveguide.
Figure 10B:
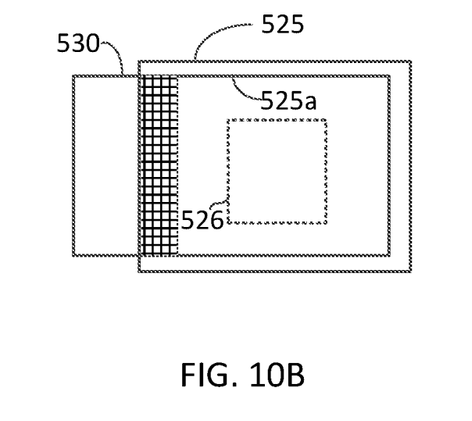
FIG. 10B is a schematic plan view of a beam splitter overlapping a small portion of a useable area of an output coupler of a pupil replicating waveguide.

FIGS. 10A and 10B schematically illustrate relative positions of the beam splitter 530 and the output coupler 525 in partially overlapping embodiments, where the overlap areas are indicated by square grid shading. The output coupler 525 may have a usable area 525a that is somewhat smaller than the full extent of the output coupler 525, and the beam splitter 530 may be positioned so as not to overlap the usable area 525a, as illustrated in FIG. 10A. In other embodiments the beam splitter 530 may be positioned so as to slightly overlap the usable area 525a, as illustrated in FIG. 10B. In some embodiments the overlap area does not exceed 10% of the area of the output coupler 525 in the plane of the waveguide. In some embodiments the overlap area does not exceed 5% of the area of the output coupler 525 in the plane of the waveguide.

The usable area 525a may correspond, for example, to the area of the eyebox 940, i.e. the area encompassing all locations of a user's eye for an acceptable image quality perception. In some embodiments, e.g. in embodiments of the display apparatus 900, the usable area 525a may, for example, be an area of the output coupler 525 from which output light is transmitted into the eyebox 940, i.e. into the area encompassing all locations of a user's eye with an acceptable image quality perception. In some embodiments, e.g. in embodiments of the display apparatus 800, the usable area 525*a* may, for example, be an area of the output coupler 525 from which output light is transmitted into the usable area 745 of the display panel 740, e.g. the area of the pixel array thereof. In some embodiments, the beam splitter may partially overlap an edge of the usable area 525*a* of the output coupler, to allow for some visual artifacts due to the spurious reflections of the beam splitter to appear in the peripheral vision of a viewer. In at least some of such embodiments, a central region 526 spanning at least 50% of a total area of the output coupler 525 in the middle of the output region 503 remains free of an overlap with the beam splitter 530.

Accordingly, an aspect of the present disclosure provides a method for increasing optical pupil replication density in an optical pupil replicating waveguide, e.g. waveguides 300 or 500, may include using a beam splitter, e.g. 330 or 530, upstream of an output coupler of the waveguide, e.g. output coupler 525, for splitting the light into sub-beams propagating toward different ones of opposing outer surfaces, e.g. 312 and 314, or 512 and 514, of the waveguide, and to re-direct the sub-beams out of the waveguide without engaging the beam splitter.

A related aspect of the present disclosure provides a method for expanding a beam of light, e.g. the beam 13 in FIGS. 3 and 5A, which may include propagating the beam 13 in the substrate, e.g. 310 or 510, by reflecting the beam 13 from the outer surfaces, e.g. 312 and 314 or 512 and 514, of the substrate, so as to cause the beam to impinge on an output coupler, e.g. 525, to be directed out of the substrate, e.g. by diffraction, as output light, e.g. light beam comprised of beam portions 515' and 515". As the beam 13 propagates towards the outer coupler, it is split in the vertical plane normal to the outer surfaces upstream of the output coupler, for further propagation in the substrate toward the output coupler, with the split-off beams at least partially filling pupil holes after being re-directed by the output coupler, as explained above with reference to FIGS. 3 to 6B. The splitting is performed by a beam splitter, such as the beam splitter 330 or 530, e.g. a partial reflector, disposed between the outer surfaces of the substrate substantially upstream of the output coupler, so as not to overlap with at least a usable portion of the output coupler when viewed in a vertical direction normal to the substrate, to substantially avoid intersecting the output light, or to overlap only a small fraction of the total area of the output coupler in the plane of the substrate.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 11A:
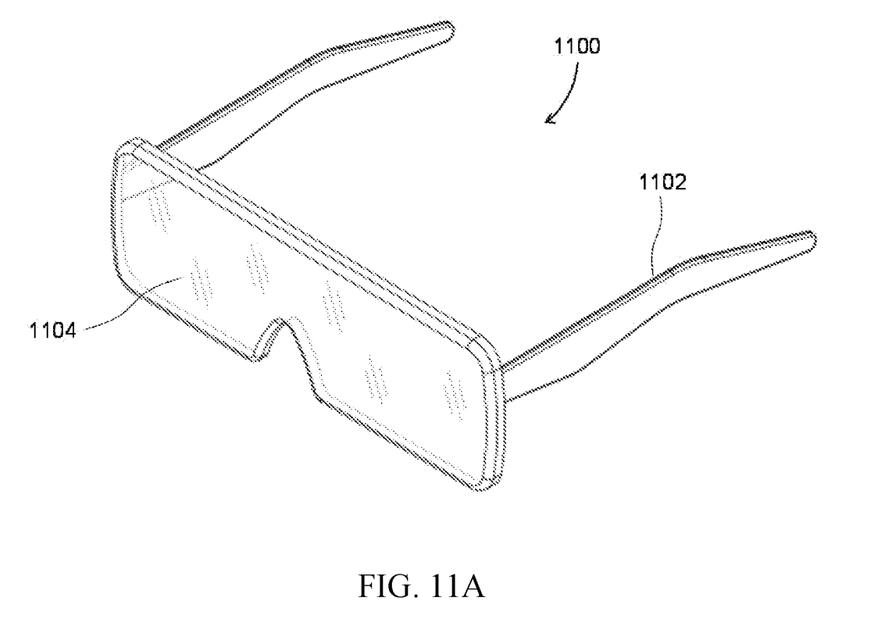
FIG. 11A is an isometric view of an eyeglasses form factor near-eye AR/VR display incorporating a waveguide of the present disclosure.
Figure 11B:
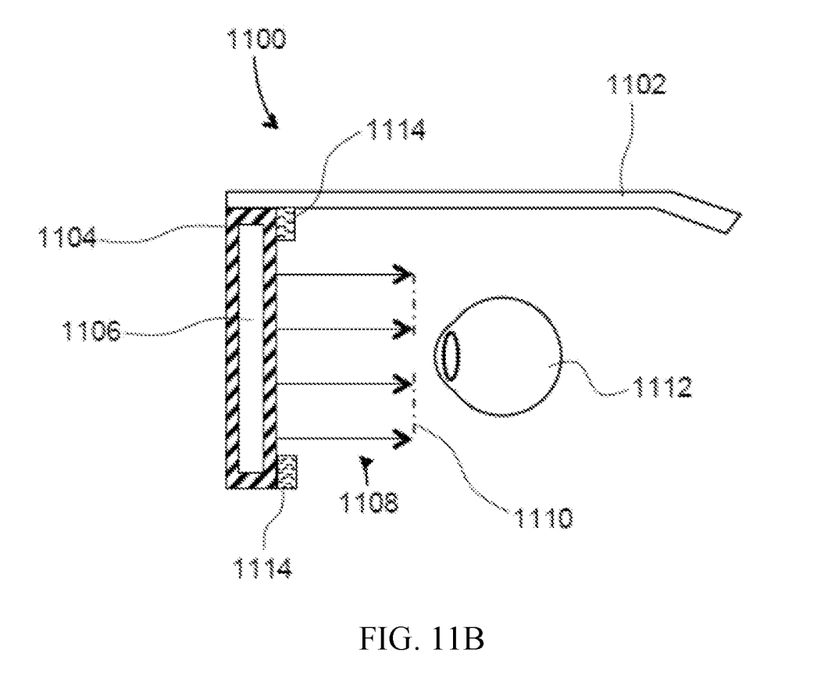
FIG. 11B is a side cross-sectional view of the display of FIG. 11A.

Referring to FIGS. 11A and 11B, a near-eye AR/VR display 1100 includes a body or frame 1102 having a form factor of a pair of eyeglasses. A display 1104 includes a pupil-replicating waveguide 1106 (FIG. 11B), which provides image light 1108 to an eyebox 1110, i.e. a geometrical area where a good-quality image may be presented to a user's eye 1112. The pupil-replicating waveguide 1106 may include any of the waveguides described herein, i.e. the waveguide 300 of FIGS. 3 and 4, the waveguide 500 of FIG. 5A, 5B, 7, 8, or 9.

An image light source of the near-eye AR/VR display 1100 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The near-eye AR/VR display 1100 may further include an eye-tracking system 1114 for determining, in real time, the gaze direction and/or the vergence angle of the user's eyes 1112. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Yet furthermore, the near-eye AR/VR display 1100 may include an audio system, such a set of small speakers or headphones.

Figure 12:
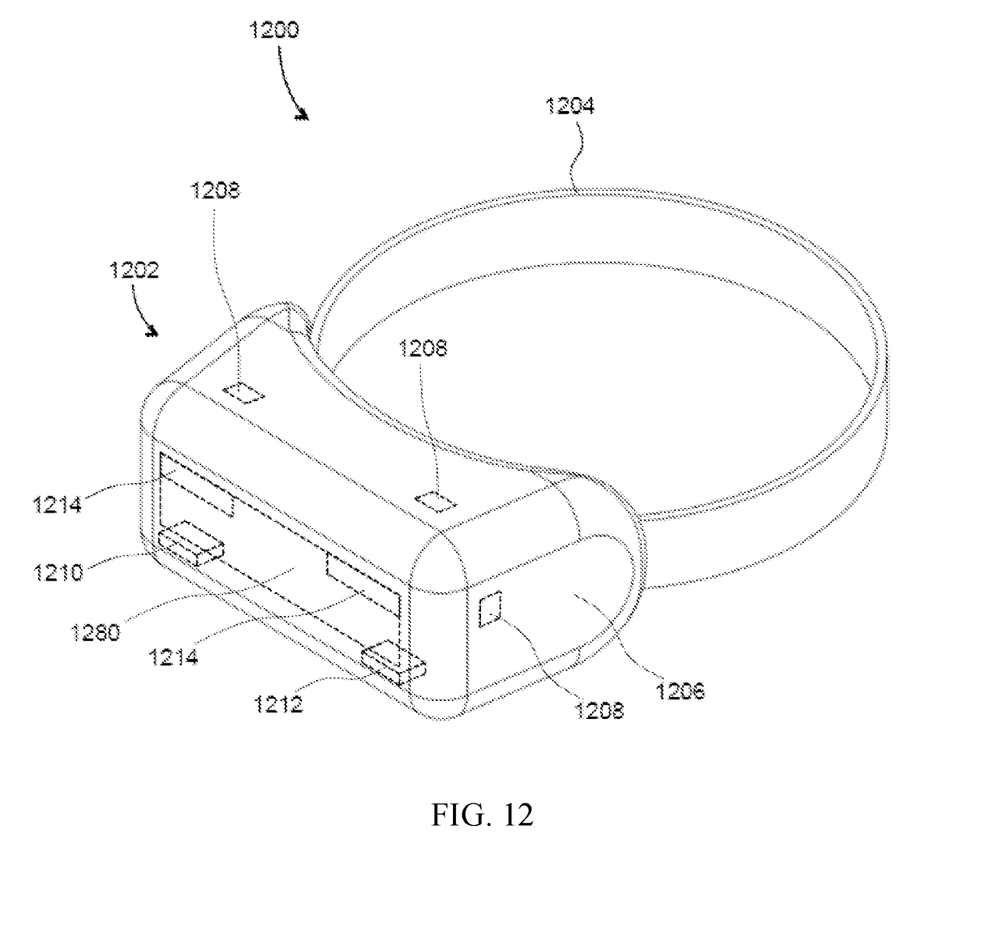
FIG. 12 is an isometric view of a head-mounted display (HMD) incorporating a waveguide of the present disclosure.

Turning now to FIG. 12, an HMD 1200 is an example of an AR/VR wearable display system enclosing user's eyes, for a greater degree of immersion into the AR/VR environment. The HMD 1200 may be a part of an AR/VR system including a user position and orientation tracking system, an external camera, a gesture recognition system, control means for providing user input and controls to the system, and a central console for storing software programs and other data for interacting with the user for interacting with the AR/VR environment. The function of the HMD 1200 is to augment views of a physical, real-world environment with computer-generated imagery, and/or to generate entirely virtual 3D imagery. The HMD 1200 may include a front body 1202 and a band 1204. The front body 1202 is configured for placement in front of eyes of the user in a reliable and comfortable manner, and the band 1204 may be stretched to secure the front body 1202 on the user's head. A display system 1280 may include any of the pupil-replication waveguides described herein. The display system 1280 may be disposed in the front body 1202 for presenting AR/VR images to the user. Sides 1206 of the front body 1202 may be opaque or transparent.

In some embodiments, the front body 1202 includes locators 1208, an inertial measurement unit (IMU) 1210 for tracking acceleration of the HMD 1200, and position sensors 1212 for tracking position of the HMD 1200. The locators 1208 are traced by an external imaging device of a virtual reality system, such that the virtual reality system can track the location and orientation of the HMD 1200. Information generated by the IMU and the position sensors 1212 may be compared with the position and orientation obtained by tracking the locators 1208, for improved tracking of position and orientation of the HMD 1200. Accurate position and orientation is important for presenting appropriate virtual scenery to the user as the latter moves and turns in 3D space.

The HMD 1200 may further include an eye tracking system 1214, which determines orientation and position of user's eyes in real time. The obtained position and orientation of the eyes allows the HMD 1200 to determine the gaze direction of the user and to adjust the image generated by the display system 1280 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1202.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Furthermore, elements or features described with reference to a particular embodiment may be used in other embodiments. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display apparatus comprising:
   a light source for emitting a beam of light;
   a display panel disposed to receive at least a portion of output light and to provide image light;
   a projection lens disposed to receive the image light from the display panel; and
   a pupil-replicating waveguide comprising a substrate, the substrate comprising:
      an input region configured to couple, into the substrate, the beam received in an input pupil;
      an output region at a distance from the input region comprising an output coupler configured to out-couple at least a portion of the beam out of the substrate as output light;
      two opposing outer surfaces for guiding the beam in the substrate by reflections therefrom; and
      a beam splitter disposed in an optical path of the beam between the input region and output region and configured to split the beam into beam portions propagating toward the two opposing outer surfaces,
      wherein the pupil-replicating waveguide is disposed in part between the projection lens and the display panel, and wherein the beam splitter is disposed not to intersect the image light propagating from the display panel to the projection lens.

2. The display apparatus of claim 1, wherein the output coupler comprises an output diffraction grating configured to diffract at least a portion of the beam into an eyebox outside of the pupil-replicating waveguide, and wherein the beam splitter is disposed away from an optical path of the light diffracted by the output diffraction grating into the eyebox.

3. The display apparatus of claim 1, wherein the input region includes an input coupler configured to couple the beam of light into the substrate.

4. The display apparatus of claim 3, wherein the input coupler and the beam splitter overlap when viewed in a vertical direction normal to at least one of the two opposing outer surfaces.

5. The display apparatus of claim 1, wherein the beam splitter comprises a partially reflective layer extending parallel to, and between, the two opposing outer surfaces.

6. A method for increasing optical pupil replication density, the method comprising:
   using, in an optical pupil replicating waveguide, an input coupler to couple a beam of light into the optical pupil replicating waveguide; and
   using, in the optical pupil replicating waveguide, a beam splitter for splitting, upstream of an output coupler of the optical pupil replicating waveguide, a beam of light propagating in the optical pupil replicating waveguide into sub-beams propagating toward different ones of two opposing outer surfaces of the optical pupil replicating waveguide, and for re-directing the sub-beams out of the optical pupil replicating waveguide without impinging onto the beam splitter,
   wherein the optical pupil replicating waveguide is disposed in part between a projection lens and a display panel, and wherein the beam splitter is disposed not to intersect image light propagating from the display panel to the projection lens.

7. The method of claim 6, further comprising using a beam splitting layer extending between and along the two opposing outer surfaces away from an optical path of the beam to at least one of: an eye box of a near-eye display; or a pixel array of a panel display.

8. The method of claim 6, further comprising using a folding reflector for pupil replication along a first direction and using an output coupler for pupil replication along a second, different direction, and using the beam splitter for at least doubling a pupil replication density along at least one of the first direction and the second, different direction.

* * * * *